United States Patent Office 3,551,496
Patented Dec. 29, 1970

3,551,496
DIFLUOROAMINES AND PREPARATION THEREOF
Anthony J. Passannante, Metuchen, and Leland K. Beach, Westfield, N.J., assignors to Esso Research and Engineering Company, a corporation of Delaware
Filed Dec. 24, 1959, Ser. No. 862,744
Int. Cl. C07c 87/04, 87/22, 87/26
U.S. Cl. 260—583                                    11 Claims

ABSTRACT OF THE DISCLOSURE

Difluoroamine compounds are prepared by reacting nonconjugated diolefins, i.e. 1,4-pentadiene and 1,5-hexadiene with tetrafluorohydrazine at a temperature in the range of from about 20 to about 300° C. The organic difluoroamino compounds formed by the above-described reactions are useful as oxidizers in rocket propellants.

---

The present invention relates to difluoroamine compounds and the preparation thereof. Specifically, it concerns the synthesis of C—$NF_2$ compounds by reacting nonconjugated dienes with tetrafluorohydrazine. The organic difluoroamino compounds obtained by these reactions are useful as oxidizers in rocket propellants.

Extensive research has been carried out heretofore in an effort to prepare strong oxidizers for rocket propellant fuels, such as boron. It is known that fluorine compounds will oxidize boron fuels to borontrifluoride or boronoxyfluoride. Considerable difficulty has been encountered in preparing suitable oxidizers in which one or more difluoroamino groups are attached to carbon in carbon chain compounds. It has been especially difficult to introduce more than two difluoroamino groups into unsaturated aliphatic hydrocarbons.

One object of the present invention is to provide a suitable method for preparing compounds having a high $NF_2$ to carbon content. Another object of the invention is to provide difluoroamino compounds which are suitable as oxidizers or oxidizer-binders in boron-containing propellants.

It has been discovered that difluoroamino compounds may be made by reacting tetrafluorohydrazine with hydrocarbon polyolefins in the vapor or liquid phase. The hydrocarbon polyolefins are preferably $C_5$ to $C_6$ nonconjugated diolefins, such as 1,4-pentadiene and 1,5-hexadiene, in which at least one of the double bonds is in the alpha position.

FIG. 1 is the infrared absorption spectrum of 1,2,4,5-tetrakis-(difluoroamino) pentane, one of the novel compounds of this invention.

FIG. 2 is the infrared absorption spectrum of 4,5-bis-(difluoroamino) 1-pentene, another novel compound of this invention.

In accordance with the present invention, a nonconjugated hydrocarbon polyolefin is introduced into a reaction zone together with tetrafluorohydrazine, which is usually a gas, and the resulting mixture is maintained at a temperature of about 20 to 300° C. under pressures of 10 mm. or 100 mm. to 50 or more atmospheres for a period of time which is sufficient to produce the desired conversion. For most purposes the reaction time, depending upon the type of process, will be from about 1 or 2 seconds at the higher temperatures up to several hours or even several days at the lower temperatures. The vapor phase reactions are generally carried out at temperatures above the boiling point of the olefin, which in the case of the $C_5$ and $C_6$ diolefins is about 60° C. The preferred reaction temperature is between about 100 and 175° C. because the reaction rate is quite good at these temperatures and the products are less susceptible to detonation than they are at higher temperatures. Where stoichiometric amounts of reactants are used at 140 to 160° C., for example, it will be found that the reaction is substantially complete in about 1 to 2 hours. Of course, shorter reaction times may be employed in continuous processes in which one of the reactants may be continuously recycled to the reaction zone after separation from the reaction mixture. Since the polyolefin is generally the lower priced chemical, it would be better to recycle it rather than the tetrafluorohydrazine. However, in some instances it may be desirable to recycle the hydrazine reactant instead of the diolefin.

The reaction may also be carried out in a liquid phase at temperatures of 20 to 300° C. in a reaction vessel provided with suitable means for agitating the liquid in it. It is generally desirable to use superatmospheric pressures, e.g. 2 to 30 atmospheres, to dissolve more of the tetrafluorohydrazine gas in the liquid medium. When the reaction zone is under about 1 atmosphere of $N_2F_4$ pressure, the liquid usually contains only about 8 grams/liter of dissolved tetrafluorohydrazine. At pressures of 10 and 20 atmospheres the amount of dissolved gas increases by ten and twentyfold, respectively. In many cases, the polyolefin hydrocarbon may be the diluent, while in other instances it may be desirable to have an inert diluent present, such as a perfluorinated alkane or a $C_4$ to $C_{10}$ hydrocarbon, especially in liquid phase reactions. The quantity of the diluent is not important as long as there is a sufficient quantity, e.g. 10 to 80 wt. percent, in the reaction mixture to facilitate handling it or the products obtained from the reaction. Aside from the diluents mentioned above, other suitable inert diluents include hexane, butane, decane, carbon tetrachloride, chloroform, perfluorinated pentane, etc. Because many of the reaction products have relatively high boiling points, it is usually advantageous to use a diluent which boils at a substantially lower temperature so that it may easily be stripped from the product. On the other hand, high boiling diluents are also useful since the reaction products can be selectively distilled from such diluents.

A number of difluoroamino compounds may be prepared by this process, and, depending upon the conditions employed, specific compounds are produced in larger or smaller amounts. In general, the mol ratio of tetrafluorohydrazine to the $C_5$ or $C_6$ diolefin should be about 0.1 to 10:1. It has been found that using 2 or more moles of tetrafluorohydrazine per mole of diene favors the formation of tris- and tetrakis-difluoroamino compounds, while using a lower molar ratio, e.g. 0.3 to 0.5:1, favors the formation of bis-difluoroamino compounds. Thus, by adjusting the molar ratio of the reactants it is possible to obtain yields as high as 90% of a particular compound.

The difluoroamino compounds prepared in accordance with the present invention are liquids which have an $NF_2/C$ ratio of 0.2 to 0.8:1. Since some of them boil within a rather narrow boiling range, and in view of the fact that they may explode, it is advisable to use low temperature separation techniques, e.g. chromatographic and vacuum distillation methods. For instance, two of the novel compositions viz. 3,4-bis-(difluoroamino) pentene-1 and 1,2,4,5-tetrakis-(difluoroamino) pentane, may be separated by bulb-to-bulb distillation in vacuo. Also preparative gas chromatography may be employed to separate and collect very pure samples of the components in the reaction mixture. A suitable absorbent is firebrick impregnated with 30% silicone oil.

The following difluoroamino hydrocarbon compounds can be prepared by the process described herein from 1,4-pentadiene and 1,5-hexadiene:

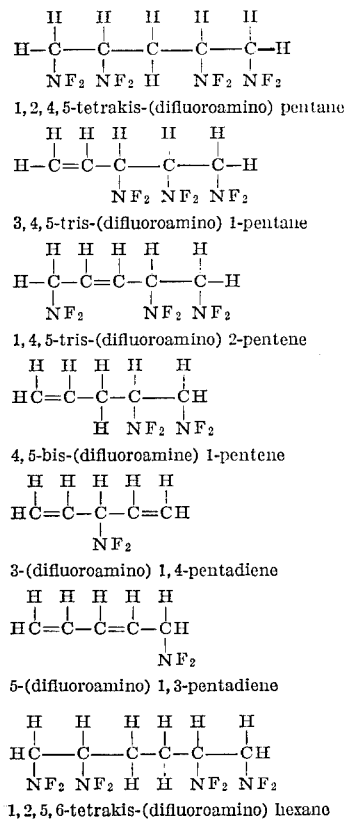

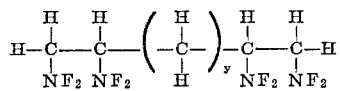

The structural formulas given above are not intended to show the various isomers which exist for some of the compounds. For instance, in the case of 1,2,4,5-tetrakis-(difluoroamino) pentane there are meso, dextro and levo forms. All of the compounds are characterized by the fact that they have straight carbon chains to which one or more difluoroamino groups are attached. They are liquids and are either saturated or unsaturated depending upon the extent to which the polyolefin feed reacted with the difluoroamine furnishing compound. The two tetrakis-(difluoroamino) compounds may be represented by the following generic structure:

$$H-\underset{NF_2}{\underset{|}{C}}-\underset{NF_2}{\underset{|}{C}}-\left(-\underset{H}{\underset{|}{C}}-\right)_y-\underset{NF_2}{\underset{|}{C}}-\underset{NF_2}{\underset{|}{C}}-H$$

wherein y is an integer of 1 to 2.

A number of reactions occur when tetrafluorohydrazine is contacted with 1,4-pentadiene under the conditions described herein. Aside from addition of NF₂ groups to the double bonds, there is also some hydrogen replacement which results in the formation of mono- and tris-substituted materials. There are also definite indications that an allylic rearrangement takes place as evidenced by the formation of 5-difluoroamino 1,3-pentadiene and 1,4,5-tris-(difluoroamino) 2-pentene. A reaction scheme showing the reactions which are believed to take place during the process is set forth in Table I:

TABLE I

Reaction N₂F₄—1,4-Pentadiene
(Vinyl hydrogens not shown)

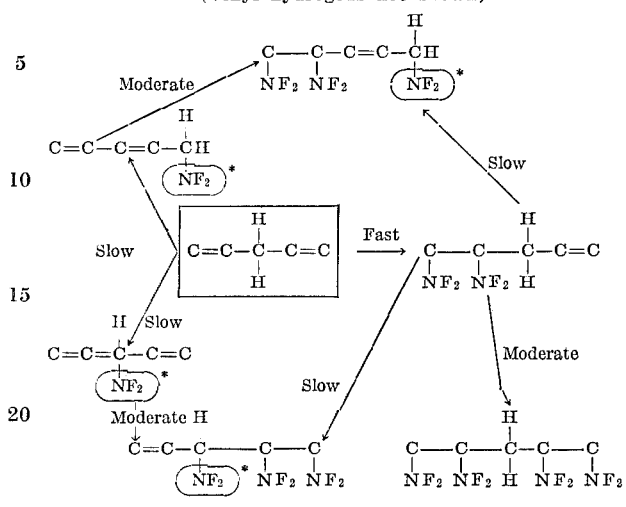

*(NF₂) indicates hydrogen substitution.

The novel difluoroamine compounds, especially the tetrakis (difluoroamino) compound, that have NF₂/C ratios of more than 0.6:1 are useful not only as oxidizers for boron propellant fuels, but they may also be employed as monopropellants. Moreover, they are useful oxidizing agents for many chemical reactions and may be utilized to make carbon black and hydrogen fluoride by pyrolyzing them. Because they are relatively sensitive to explosion initiators, they are substitutes for mercury fulminate, a well known detonator.

The following examples demonstrate how the present process may be carried out and contain further descriptions of the new compounds made by this process.

EXAMPLE 1

Various mole ratios of tetrafluorohydrazine and 1,4-pentadiene are introduced into a 1 liter glass reaction bulb provided with a thermowell to accommodate a thermocouple. The reactants are allowed to remain in contact with each other for periods of 2 to 20 hours at a temperature of 110° C. and an initial absolute pressure of 600 mm. of mercury. Table II contains the data recorded for each run. It will be noted that higher yields of the tetrakis compound are obtained when stoichiometric or higher amounts of tetrafluorohydrazine are employed.

TABLE II

|  | Run 1 | Run 2 | Run 3 |
|---|---|---|---|
| N₂F₄/C₅H₈, mole ratio | 1/2 | 1/1 | 2/1 |
| Time, hours | 2 | 3 | 20 |
| Percent N₂F₄ consumed | 100 | 100 | 88 |
| Percent C₅H₈ consumed | 35 | 73 | 100 |
| Product distribution, mole percent: |  |  |  |
| Mono: |  |  |  |
| 3(NF₂)1,4-pentadiene | 4 | 0 | 0 |
| 5(NF₂)1,3-pentadiene | 4 | 0 | 0 |
| Bis: |  |  |  |
| 4,5-bis(NF₂)pentene-1 | 80 | 78 | 12 |
| Tris: |  |  |  |
| 3,4,5-tris(NF₂)pentene-1 | 1 | 1 | 1 |
| 1,4,5-tris(NF₂)pentene-2 | 5 | 9 | 13 |
| Tetrakis: |  |  |  |
| Meso, 1,2,4,5-tetrakis(NF₂)pentane | 3 | 6 | 37 |
| d,l;1,2,4,5 tetrakis(NF₂)pentane | 3 | 6 | 37 |

The formation of the bis compounds was favored when 1 to 2 moles of the diene feed per mole of N₂F₄ was employed, while the tris and tetrakis compounds were produced in larger amounts when less than 1 mole of diene per mole of N₂F₄ was used. The liquid compounds in the reaction mixture were separated in a pure form by preparative gas chromatography using a (20%) silicone impregnated firebrick absorbent. They were then characterized by molecular weight, fine line nuclear magnetic resonance and/or infrared absorption data.

EXAMPLE 2

In another synthesis reaction, 0.006 mole of tetrafluorohydrazine was reacted with 0.003 mole of 1,5-hexadiene in the same reactor used in Example 1 at 110° C. and an initial absolute pressure of 175 mm. of mercury. The reaction was carried out for 19 hours, at the end of which time the products in the reaction mixture were separated chromatographically as described in Example 1. The principal product was 1,2,5,6-tetrakis-(difluoroamino) hexane. The yield of this compound was about 80%.

The most attractive compounds for rocket propellants are the tetrakis (difluoroamino) compounds since they are highly reactive substances. They are useful not only as liquid oxidizers in propellant systems but they can also be used as plasticizers in such systems. The $C_5$ tetrakis compound, namely 1,2,4,5-tetrakis-(difluoroamino) pentane, contains 75.4 wt. percent $NF_2$ and has a boiling point of 190 to 192° C. The infrared spectrum curve obtained with a pure sample of this compound is shown in FIG. 1. The compound was analyzed for nitrogen and found to contain 16.8% N (theoretical nitrogen is 16.3%).

The 4,5-bis-(difluoroamino) 1-pentene, which contains 60.4 wt. percent $NF_2$, has a boiling point of 124 to 125° C. and a density of 1.215 at 20° C. Its infrared spectrum curve is shown in FIG. 2. This compound was also analyzed for nitrogen and found to contain 20.0% N (theoretical nitrogen is 20.3%).

The nuclear magnetic resonance (NMR) data set forth in Table III serve to further identify the structure and composition of some of the fluorine compounds made in accordance with the present invention.

$NF_2$ on secondary carbons). This shows that addition of two $NF_2$ groups occurred across a terminal double bond. The proton resonance measurement for this compound show that there are 3 hydrogens alpha to $NF_2$ groups for each hydrogen which is beta to $NF_2$ groups. The structures of the other compounds may be arrived at in a similar manner. The use of nuclear magnetic resonance in the analysis of chemicals is described in "Nuclear Magnetic resonance Applications to Organic Chemistry" (John D. Roberts, published by McGraw-Hill Book Company 1959).

The gas chromatography retention times for the new difluoroamino compounds and reference compounds are set forth in Table IV.

TABLE IV

| Compound | Retention time relative to benzene |
|---|---|
| $C_5$: | |
| 1,4-pentadiene | 0.25 |
| 3-difluoroamino 1,4-pentadiene | 0.8 |
| 5-difluoroamino 1,3-pentadiene | 1.2 |
| 4,5-bis-(difluoroamino) 1-pentene | 1.95 |
| 3,4,5-tris-(difluoroamino) 1-pentene | 5.9 |
| 1,4,5-tris-(difluoroamino) 2-pentene | 7.4 |
| 1,2,4,5-tetrakis-(difluoroamino) pentane | (¹) |
| $C_6$: | |
| 1,5-hexadiene | 0.5 |
| 5,6-bis-(difluoroamino) 1-hexene | 3.8 |
| 1,2,5,6-tetrakis-(difluoroamino) hexane | 25 |
| n-Octane, secondary reference | 3.1 |

¹ 7.9, 8.3 (meso and D, L).

TABLE III

[Fluorine Resonance Measurements ¹]

| | Location ² | Splitting | Relative intensity | Structure assignment |
|---|---|---|---|---|
| $NF_2$—$CH_2$—CH—$CH_2$—CH—$CH_2$—$NF_2$ ³<br>   \|         \|<br>  $NF_2$    $NF_2$ | −4,650 | Double, triplet | 1 | $NF_2$ on secondary carbon. |
| | −5,440 | Triplet | 1 | $NF_2$ on primary carbon. |
| $NF_2$—$CH_2$—CH=CH—CH—$CH_2NF_2$ ³<br>                    \|<br>                   $NF_2$ | ⁴ −4,770 | do | 1 | $NF_2$ on secondary carbon. |
| | ⁴ −5,290 | do | 2 | $NF_2$ on primary carbon. |
| $CH_2$=CH—$CH_2$—CH—$CH_2$—$NF_2$<br>              \|<br>            $NF_2$ | −4,670 | do | 1 | $NF_2$ on secondary carbon. |
| | −5,390 | do | 1 | $NF_2$ on primary carbon. |
| $NF_2$—$CH_2$—CH—$CH_2$—$CH_2$—CH—$CH_2$—$NF_2$<br>   \|                    \|<br>  $NF_2$                $NF_2$ | −4,720, 4,640 | Doublet | 1 | $NF_2$ on secondary carbon. |
| | −5,480 | Triplet | 1 | $NF_2$ on primary carbon. |

[Proton Resonance Measurements ⁵]

| | Location ⁶ | Relative intensity | Structure Assignment |
|---|---|---|---|
| $NF_2$—$CH_2$—CH—$CH_2$—CH—$CH_2$—$NF_2$<br>   \|         \|<br>  $NF_2$    $NF_2$ | +135<br>+151 | 3<br>1 | H alpha to $NF_2$.<br>H beta to $NF_2$. |
| $CH_2$=CH—$CH_2$—CH—$CH_2NF_2$<br>              \|<br>            $NF_2$ | +64<br>+125<br>+174 | 3<br>2 | Olefinic H.<br>H alpha to $NF_2$.<br>H beta to $NF_2$. |
|         H         H<br>        \|         \|<br>$F_2N$—$CH_2$—C—$CH_2$—$CH_2$—C—$CH_2NF_2$<br>        \|         \|<br>       $NF_2$        $NF_2$ | | 1.5<br>1 | H alpha to $NF_2$.<br>H beta to $NF_2$. |

¹ Measurements made at 40 mc. at a sweep rate of 20.0 c.p.s.
² Measured in cycles with reference to trifluoroacetic acid.
³ These measurements made in mixture. Assignments were made by running samples in which this component increased in concentration as measured by gas chromatography.
⁴ Measured in presence of 1,2,4,5-tetrakis-(difluoroamino) pentane.
⁵ Measurements made at 40 mc. at a sweep rate of 1.89 c.p.s.
⁶ Measured in cycles with reference to internal benzene.

The location and relative intensity of the fluorine and proton absorptions indicate that the structures for the novel difluoroamine compounds in Table III to be correct. For example, the fluorine spectrum for 1,2,4,5-tetrakis-($NF_2$) pentane shows a 1:1 intensity ratio for $NF_2$ on $CH_2$ (i.e. $NF_2$ on primary carbons) to $NF_2$ on CH (i.e.

The novel compounds in the above table have been identified and assigned structures based on their mode of syntheses, their nuclear magnetic resonance spectra, their infrared spectra and their gas chromatographic retention times (which correspond to the relative boiling points of the members in a given series).

It is not intended to restrict the present invention to the foregoing examples which are merely given to demonstrate some of the embodiments of the invention. It should only be limited to the appended claims in which it is intended to claim all of the novelty inherent in the invention as well as the modifications and equivalents coming within the scope and spirit of the invention.

What is claimed is:
1. 1,2,4,5-tetrakis(difluoroamino)pentane.
2. 3,4,5-tris(difluoroamino)-1-pentene.
3. 1,4,5-tris(difluoroamino)-2-pentene.
4. 3-(difluoroamino)-1,4-pentadiene.
5. 5-(difluoroamino)-1,3-pentadiene.
6. 1,2,5,6-tetrakis(difluoroamino)hexane.
7. Process for making difluoroamino compounds which comprises contacting a $C_5$ to $C_6$ hydrocarbon nonconjugated diolefin with tetrafluorohydrazine at 20 to 300° C. and recovering a hydrocarbon compound containing at least one difluoroamino group.
8. Process for making difluoroamino compounds which comprises reacting 1,4-pentadiene with tetrafluorohydrazine in the vapor phase at 100 to 175° C. and recovering liquid hydrocarbon compounds containing at least one difluoroamino group.
9. Process for making difluoroamino compounds which comprises contacting 1 mole of 1,5-hexadiene with 0.1 to 10 moles of tetrafluorohydrazine in the vapor phase at 140 to 160° C. and 100 mm. to about 1 atmosphere pressure and recovering hydrocarbon compounds containing 1 to 4 difluoroamino groups.
10. Process for preparing difluoroamino compounds which comprises reacting tetrafluorohydrazine with a $C_5$ to $C_6$ straight chain hydrocarbon diolefin selected from the group consisting of 1,4-pentadiene and 1,5-hexadiene and recovering as products compounds in which $NF_2$ groups are added to double bonds of the diolefin and compounds in which an $NF_2$ group is substituted for hydrogen in the diolefin.
11. A process of preparing bis(difluoroamino)alkenes which comprises reacting a nonconjugated diolefin with tetrafluorohydrazine at a temperature of at least 60° C.

References Cited
UNITED STATES PATENTS
2,472,361    6/1949    Arsem _____ 260—583

CHARLES B. PARKER, Primary Examiner

R. L. RAYMOND, Assistant Examiner

U.S. Cl. X.R.
149—109